United States Patent
Karuppoor et al.

(10) Patent No.: US 11,938,544 B2
(45) Date of Patent: Mar. 26, 2024

(54) SYSTEMS AND METHODS FOR MANUFACTURING OR REPAIRING COMPONENTS AT A REMOTE WORK SITE

(71) Applicant: Schlumberger Technology Corporation, Sugar Land, TX (US)

(72) Inventors: Srinand Sreedharan Karuppoor, Sugar Land, TX (US); Manuel Marya, Sugar Land, TX (US); Iain Michael Cooper, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 248 days.

(21) Appl. No.: 15/718,905

(22) Filed: Sep. 28, 2017

(65) Prior Publication Data

US 2019/0091769 A1  Mar. 28, 2019

(51) Int. Cl.
*B22F 12/82* (2021.01)
*B22F 9/08* (2006.01)
*B22F 10/28* (2021.01)
*B33Y 10/00* (2015.01)
*B33Y 30/00* (2015.01)
*B33Y 40/20* (2020.01)
*B33Y 50/02* (2015.01)
*B33Y 70/00* (2020.01)
(Continued)

(52) U.S. Cl.
CPC .............. *B22F 9/082* (2013.01); *B22F 10/28* (2021.01); *B33Y 10/00* (2014.12); *B33Y 30/00* (2014.12); *B33Y 40/20* (2020.01); *B33Y 50/02* (2014.12); *B33Y 70/00* (2014.12); *B22F 2009/0828* (2013.01); *B22F 2009/0836* (2013.01); *B22F 10/38* (2021.01); *B22F 10/64* (2021.01); *B22F 10/66* (2021.01); *B22F 12/224* (2021.01); *B22F 12/53* (2021.01); *B22F 12/90* (2021.01); *B22F 2998/10* (2013.01)

(58) Field of Classification Search
CPC ...... B22F 2003/1056; B22F 2003/1057; B22F 3/1055; B33Y 10/00; B33Y 30/00; B33Y 50/02; B23K 15/0086; B29C 64/00
See application file for complete search history.

(56) References Cited

U.S. PATENT DOCUMENTS 2,186,593 A * 1/1940 Ronk .................... B60F 1/046
                                                       105/215.2
3,302,892 A * 2/1967 Nilsson .................. B02C 19/06
                                                            241/1
(Continued)

FOREIGN PATENT DOCUMENTS

CN         101787509       *  7/2010

OTHER PUBLICATIONS

Gibson, I. et al. "Additive manufacturing technologies" 2010. Springer. ISBN: 978-1-4419-1119-3 e-ISBN: 978-1-4419-1120-9. (Year: 2010).*

(Continued)

*Primary Examiner* — Nicholas A Wang
(74) *Attorney, Agent, or Firm* — Jeffrey D. Frantz

(57) ABSTRACT

A system includes a mobile platform that includes a metal powder production machine that receives solid and continuous metal and outputs a metal powder. The mobile platform further includes an additive manufacturing system that receives the metal powder and outputs a manufactured component.

16 Claims, 6 Drawing Sheets

(51) Int. Cl.
   *B22F 10/38*    (2021.01)
   *B22F 10/64*    (2021.01)
   *B22F 10/66*    (2021.01)
   *B22F 12/00*    (2021.01)
   *B22F 12/53*    (2021.01)
   *B22F 12/90*    (2021.01)

(56) References Cited

U.S. PATENT DOCUMENTS

| | | | | |
|---|---|---|---|---|
| 5,433,280 | A * | 7/1995 | Smith | B29C 64/188 |
| | | | | 175/336 |
| 5,437,820 | A * | 8/1995 | Brotz | B29C 35/10 |
| | | | | 264/497 |
| 5,512,162 | A * | 4/1996 | Sachs | C23C 18/1619 |
| | | | | 205/91 |
| 6,269,540 | B1 * | 8/2001 | Islam | B23K 26/0604 |
| | | | | 29/889.7 |
| 9,289,845 | B2 | 3/2016 | Henn | |
| 2010/0161102 | A1 * | 6/2010 | Mattes | B33Y 40/00 |
| | | | | 700/108 |
| 2013/0297320 | A1 * | 11/2013 | Buser | B33Y 70/00 |
| | | | | 704/275 |
| 2013/0310961 | A1 | 11/2013 | Velez | |
| 2014/0374933 | A1 | 12/2014 | Flitsch et al. | |
| 2015/0104802 | A1 * | 4/2015 | Reep | C12Q 1/68 |
| | | | | 435/6.12 |
| 2016/0116904 | A1 | 4/2016 | Jensen et al. | |
| 2016/0180475 | A1 | 6/2016 | Phillips et al. | |
| 2016/0199911 | A1 * | 7/2016 | Dave | B29C 64/393 |
| | | | | 419/53 |
| 2016/0229005 | A1 * | 8/2016 | Ryan | B23K 26/342 |
| 2016/0236419 | A1 * | 8/2016 | Griffin | B29C 64/141 |
| 2017/0138906 | A1 | 5/2017 | Hartwig et al. | |

OTHER PUBLICATIONS

Banovic, S.W. et al. "The role of aluminum on the weldability and sulfidation behavior of iron-aluminum cladding." 1999. Welding research supplement. p. 23-30 (Year: 1999).*

Duliu, O. "Computer axial tomography in geosciences: an overview". 1999. Earth science reviews. 48. p. 265-281. (Year: 1999).*

Antony, L. et al. "Processes for production of high-purity metal powders." 2003. JOM. p. 14-18 (Year: 2003).*

Schade, C. et al. "Atomization" 2015. ASM Handbook vol. 7. ASM international. p. 58-71. (Year: 2015).*

Ratnayake, R.M. "Making sense of 3d printing/additive layer manufacturing in offshore petroleum industry: state of the art." 2016. Proceedings of the ASME 2016 35th International Conference on Ocean, Offshore and Arctic Engineering. p. 1-13. (Year: 2016).*

International Search Report and Written Opinion issued in the related PCT application PCT/US2018/053259, dated Jan. 24, 2019 (13 pages).

International Preliminary Report on Patentability issued in the PCT application PCT/US2018/053259, dated Apr. 9, 2020 (10 pages).

Written Opinion issued in Singapore patent application 11202002961R dated Mar. 17, 2021, 6 pages.

* cited by examiner

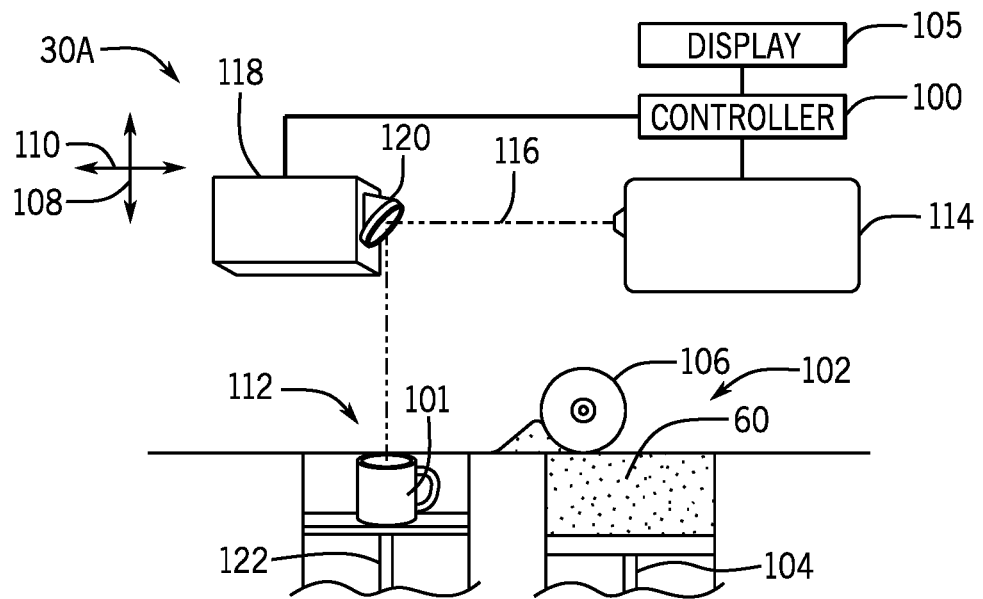
FIG. 4A
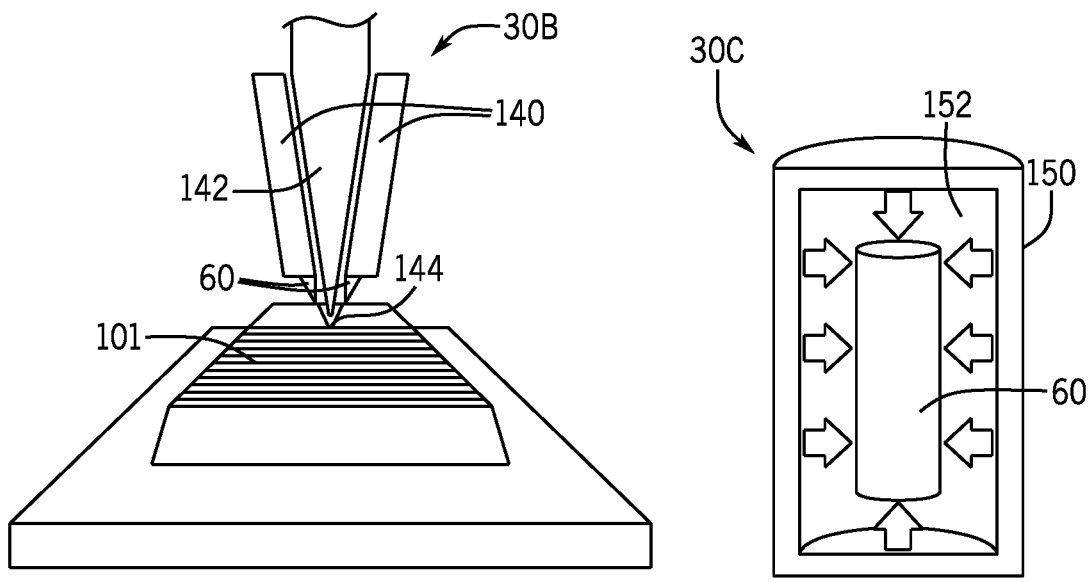
FIG. 4B
FIG. 4C

SYSTEMS AND METHODS FOR MANUFACTURING OR REPAIRING COMPONENTS AT A REMOTE WORK SITE

BACKGROUND

This disclosure relates to systems and methods for the generation of reusable material (e.g., metal, alloys, plastics, etc.) and utilizing the reusable material for the manufacture or repair of components.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of any kind.

In some industries (e.g., oil and gas, mining, logging, etc.), a work site may in a remote location that makes it difficult to transport tools, supplies, or replacement components to the work site in a timely manner. Further, the work site may use specialized tools (e.g., drilling tools, downhole Exploration and Production tools, earth moving tools, cutting tools, etc.) that endure harsh conditions that cause the tools to break down in unexpected ways and/or that may involve frequent servicing. As such, it may be desirable to decrease the time to repair or replace the tools or components of the tools.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, a system includes a mobile platform that includes a metal powder production machine that receives solid and continuous metal and outputs a metal powder. The mobile platform further includes an additive manufacturing system that receives the metal powder and outputs a manufactured component.

In another example, a method for manufacturing components includes storing a metal powder production machine and an additive manufacturing system in a vehicle at an oil and gas work site. The method further includes receiving, via the metal powder production machine, a solid and continuous metal from an oil and gas work site. Also, the method includes producing, via the metal powder production machine, a metal powder from the solid and continuous metal. In addition, the method includes manufacturing, via the additive manufacturing system, a component from the metal powder.

In yet another example, a system includes a storage container coupled to a vehicle, and the storage container includes a metal powder production machine that receives solid and continuous metal and outputs a metal powder. The storage container also includes an additive manufacturing system that receives the metal powder and outputs a manufactured component. In addition, the storage container includes a process diagnosis machine that performs non-destructive testing on the manufactured component.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4A illustrates a first embodiment of an additive manufacturing system of the component production system of FIG. 2;

FIG. 4B illustrates a second embodiment of the additive manufacturing system of the component production system of FIG. 2;

FIG. 4C illustrates a third embodiment of the additive manufacturing system of the component production system of FIG. 2;

DETAILED DESCRIPTION

Figure 1:
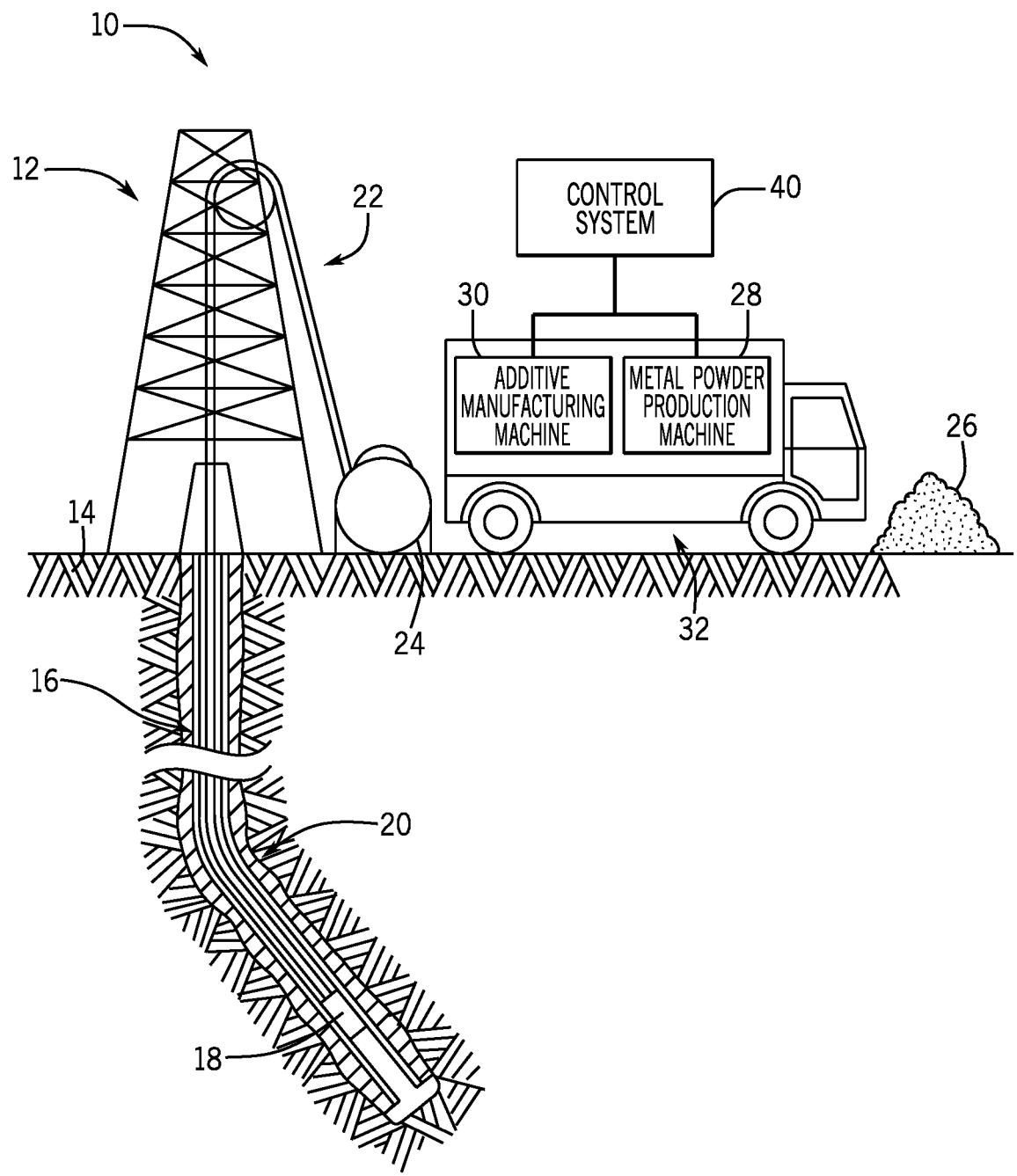
FIG. 1 illustrates an oil and gas work site that may employ the systems and methods of this disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to systems and methods that decrease the time to replace and/or repair tools at a remote work site having a location separated by some travel time from a manufacturing facility that makes or repairs tools used at the remote work site. Indeed, remote work sites may use tools in harsh conditions that cause the tools to wear down or break in unexpected ways. Further, the work site may not store spare parts for every component that could wear down or break. When the work site does not have spare parts to repair a tool, the production of the work site may slow down or stop until the tool is repaired. Because the work sites are often remote, it may be difficult and/or take a long time for the work site to acquire the spare parts. However, the work site may store scrap metal or other spare parts that are not used. Therefore, it is desirable to decrease the time to acquire spare parts for tools at work sites.

Accordingly, embodiments of this disclosure relate to systems and methods for the mobile generation of reusable material (e.g., metal, alloys, plastics, etc.) and utilizing the reusable material for the manufacture and repair of components. That is, some embodiments include one or more mobile platforms (e.g., a truck) that may receive material (e.g., scrap metal, spare parts, etc.) and output a component that may be used to repair and/or replace part of a tool. For example, the one or more mobile platforms may include a machine that receives material and atomizes the material to produce a powder of the material. The one or more mobile platforms may include a second machine that uses the powder to generate a desired component that repairs and/or replaces a tool used at the work site.

With this in mind, FIG. 1 illustrates an oil and gas work site 10 that may employ the systems and methods of this disclosure. The oil and gas work site 10 may include a well system 12 used to bore into a geological formation 14 via a wellbore 16. Further, the well system 12 may include a downhole Exploration and Production tool 18 that may be used to drill into the geological formation 14 to form the wellbore 16, or the downhole Exploration and Production tool 18 may be used to inspect certain features within the wellbore 16. Further, the wellbore 16 may not continue straight down into the geological formation 14, and the wellbore 16 may contain a turn 20. The wellbore 16 may continue past the turn into the geological formation 14 at an angle as high as ninety degrees. In the example of FIG. 1, the downhole Exploration and Production tool 18 is conveyed on a cable 22 via a logging winch system 24. Although the logging winch system 24 is schematically shown in FIG. 1 as a fixed (e.g., a long-term installation that is substantially permanent or modular) logging winch system, the logging winch system 24 may be mobile (e.g., affixed to a vehicle).

The oil and gas work site 10 also includes a scrap metal area 26 that may include any metal that is not being used in an operation at the oil and gas work site 10. For example, some components may degrade and/or break down such that they are no longer useful for their intended function. Rather than throwing the component away, the component may be stored in the scrap metal area 26 so that the material of the component may be used for other purposes (e.g., metal powder production and/or additive manufacturing). The scrap metal area 26 may also include excess metal from certain operations. For example, some components may be constructed or repaired at the oil and gas work site 10. After the construction or repair of components, there may be some material left over that may be included in the scrap metal area 26. Further, scrap metal may be transported to the oil and gas work site 10 and stored in the scrap metal area 26. In addition, spare parts that may be used to repair or replace components may also be included in the scrap metal area 26. Further, the type of metal included in the scrap metal area may be any type of metal, including low steel alloys (e.g., 4140, 4330, 8630, F22, 9Cr-1Mo, etc.), stainless steel alloys (e.g., 17-4PH, 15-5PH, 13-8Mo, 410/420, etc.), nickel base alloys (e.g., 718, 725, 625+, 625, 825, Alloy 28, etc.), titanium alloys (e.g., Ti6Al4V, Grade Beta C, etc.), cobalt based alloys (e.g., Stellite, etc.), tungsten alloys, molybdenum alloys, and so forth.

The scrap metal from the scrap metal area 26 may be useful in the oil and gas work site 10 to provide material for operations that use metal. For example, the scrap metal may be used in a metal powder production and/or additive manufacturing process. Accordingly, the oil and gas work site 10 includes a metal powder production machine 28 and an additive manufacturing system 30. The metal powder production machine 28 receives a piece of solid and continuous metal (e.g., scrap metal from the metal scrap area 26) and atomizes the piece of metal to produce a powder from the piece of metal. The metal powder production machine 28 may use any suitable process to turn the piece of metal into powder, including gas atomization, water atomization, atomization with a consumable electrode, centrifugal atomization, or any other process. The metal powder production machine 28 may produce a metal powder with particles of any suitable size, including 0 to 120 micrometers, 0 to 25 micrometers, 15 to 45 micrometers, 30 to 65 micrometers, 45 to 100 micrometers, or 50 to 120 micrometers. The size of the particles produced by the metal powder production machine 28 may depend at least in part on the type of process used, the type of additive manufacturing system 30, the type of scrap metal, etc. Further, the metal powder may also include pellets, flakes, or any other suitable type of fine particulates.

The additive manufacturing system 30 is used to receive a metal powder (e.g., from the metal powder production machine 28 or from a metal powder storage) and output a component. For example, the additive manufacturing system 30 may use a hot isostatic pressing ("HIP") process, a powder bed fusion ("PBF") process, a direct energy deposition process, or any other process to turn metal powder into useable components. Further, the output component may be a finished component that is ready for use, or the component may be a partially finished component that may require further treatment (e.g., grinding, machining, thermal processes, heat treatments such as sintering, etc.) to become a finished component.

In some embodiments, additional systems (e.g., computer numerical control machines, grinding machines, lathes, sintering systems, heat treatment systems, etc.) may be included at the oil and gas work site 10 to receive the partially finished component and output the finished component. Further, the additional systems may be included as a part of the additive manufacturing system 30, or the additional systems may be separate from the additive manufacturing system. Moreover, for embodiments in which the additional systems are separate, the additional systems may be stationary at the oil and gas work site 10, included on a vehicle 32, or located remotely from the oil and gas work site 10.

Although the metal powder production machine 28 and the additive manufacturing system 30 are schematically shown in FIG. 1 as a mobile (e.g., affixed to the vehicle 32) metal powder production machine and additive manufacturing system, the metal powder production machine 28 and the additive manufacturing system 30 may be fixed (e.g., a long-term installation that is substantially permanent or modular). For example, the metal powder production machine 28 and the additive manufacturing system 30 may fit within a storage container that is carried by the vehicle 32. Further, the storage container may be separate from the vehicle 32 and may be able to couple to different vehicles. By providing the metal powder production machine 28 and the additive manufacturing system 30 on the vehicle 32, the metal powder production machine 28 and the additive manufacturing system 30 may be more quickly dispatched to the oil and gas work site 10. Further, the vehicle 32 may travel from one oil and gas work site to another and transport the metal powder production machine 28 and the additive manufacturing system 30 without taking the time to pack and unpack the machines. Although the vehicle 32 is shown as a single vehicle in FIG. 1, the vehicle 32 may include multiple vehicles and each vehicle may carry a portion or all of either the metal powder production machine 28 or the additive manufacturing system 30.

Further, the metal powder production machine 28 and/or the additive manufacturing system 30, may be connected to a control system 40. The control system 40 may be used to control one or more functions of the metal powder production machine 28 and/or the additive manufacturing system 30. For example, the control system 40 may enable input and selection of computer models for the additive manufacturing system 30. Further, the control system 40 may be physically coupled to the metal powder production machine 28 and/or the additive manufacturing system 30, or the control system 40 may be remotely connected to the metal powder production machine 28 and/or the additive manufacturing system 30 (e.g., via Bluetooth, Wi-Fi, etc.). In addition, the control system 40 may be a computer application executable by any computing device (e.g., a computer, a smartphone, a laptop, a tablet, etc.). As such, the control system 40 may enable partial or full remote control over the metal powder production machine 28 and/or the additive manufacturing system 30.

Figure 2:
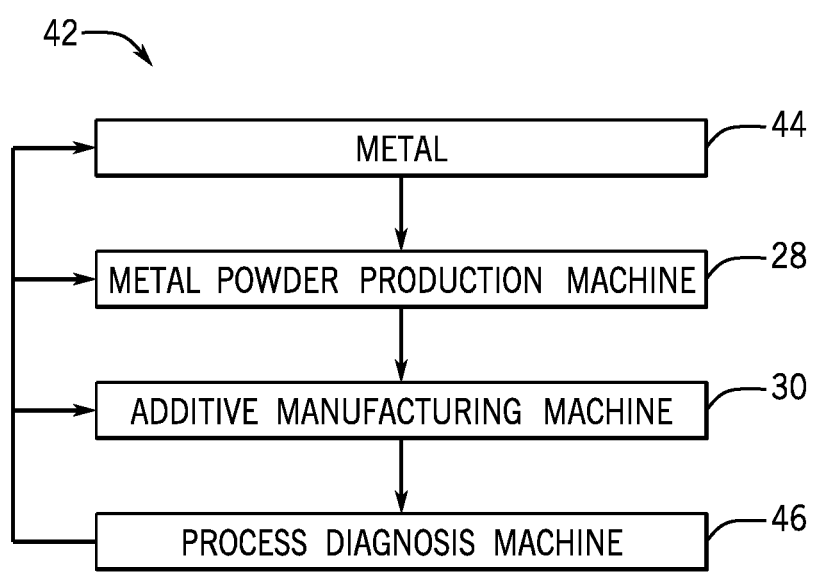
FIG. 2 is an embodiment of a schematic flow diagram of a component production system for producing components at the oil and gas site of FIG. 1.

FIG. 2 is an embodiment of a schematic flow diagram of a component production system 42 for producing components at the oil and gas site of FIG. 1. The component production system 42 includes a metal source 44, the metal powder production machine 28, the additive manufacturing system 30, and a process diagnosis machine 46 (e.g., a machine that monitors and/or diagnoses any other disclosed machine and/or process). The metal source 44 may be the metal from the metal area 26 shown in FIG. 1. The metal source 44 provides metal to the metal powder production machine 28, which receives the metal and outputs a metal powder. The metal powder produced by the metal powder production machine 28 is then used by the additive manufacturing system 30 to produce a desired component.

The process diagnosis machine 46 may be used to monitor and/or inspect the metal 44, the metal powder production machine 28, and/or the additive manufacturing system 30. For example, the process diagnosis machine 46 may be used to inspect the metal 44 to determine the chemical composition of the metal 44 (e.g., determine which elements are present and in what concentration). Further, the process diagnosis machine 46 may be used to monitor the progress of the metal powder production machine 28. For example, the process diagnosis machine 46 may stop the operation of the metal powder production machine 28 if the process diagnosis machine 46 determines that the metal powder production machine 28 has produced a sufficient amount of metal powder. In addition, the process diagnosis machine 46 may inspect the metal powder produced by the metal powder production machine 28 to determine a chemical composition of the metal powder. In some embodiments, the process diagnosis machine 46 may alter the composition of the metal powder by adding, removing, or mixing a different metal powder into the metal powder produced by the metal powder production machine 28.

Further, the process diagnosis machine 46 may monitor the progress of the additive manufacturing system 30. For example, the process diagnosis machine 46 may monitor (e.g., in real time) the component as it is being produced by the additive manufacturing system 30. If the process diagnosis machine 46 determines that the component being produced does not comply with the desired component, then the process diagnosis machine 46 may stop operation of the additive manufacturing system 30. In addition, the process diagnosis machine 46 may inspect the components produced by the additive manufacturing system 30. For example, the process diagnosis machine 46 may use non-destructive testing to inspect the components to determine if the produced component complies with certain standards applicable to the component produced (e.g., chemical composition, density, porosity, homogeneity, etc.). It should be appreciated that the process diagnosis machine 46 may include any suitable structure to perform the above described functions, including a processor, a memory, a display, a graphical user interface, a general purpose computer, a controller, a camera (e.g., the camera may be operable at any spectrum including infrared, ultrasonic, visual, etc.), a dye pen, an x-ray imaging device, a computerized axial tomography scan device, a powder blender, etc. Further, the process diagnosis machine 46 may be coupled to any combination of the metal powder production machine 28 or the additive manufacturing system 30, or the process diagnosis machine 46 may located remotely from the metal powder production machine 28, the additive manufacturing system 30, or both.

Figure 3A:
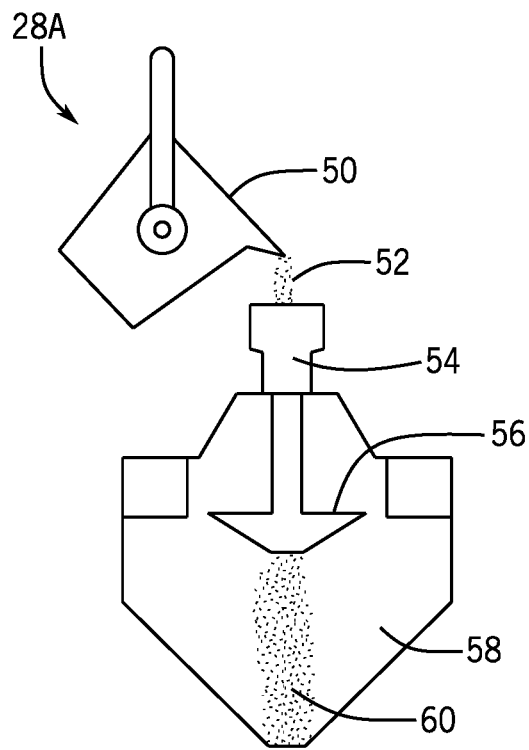
FIG. 3A illustrates a first embodiment of a metal powder production machine of the component production system of FIG. 2.

FIGS. 3A through 3D illustrate embodiments of the metal powder production machine 28. FIG. 3A illustrates an embodiment of a metal powder production machine 28A that uses a gas atomization process to receive a molten metal and output a metal powder. The scrap metal is first melted into a molten metal 52 and contained within a ladle 50. The ladle 50 then pours the molten metal 52 into a tundish 54. Then the molten metal 52 flows through the hole in the bottom of the tundish 54 and comes into contact with an atomizing gas spray 56, which separates the molten metal 52 into metal particles 60. The metal particles 60 then harden into a metal powder in an atomizing chamber 58.

Figure 3B:
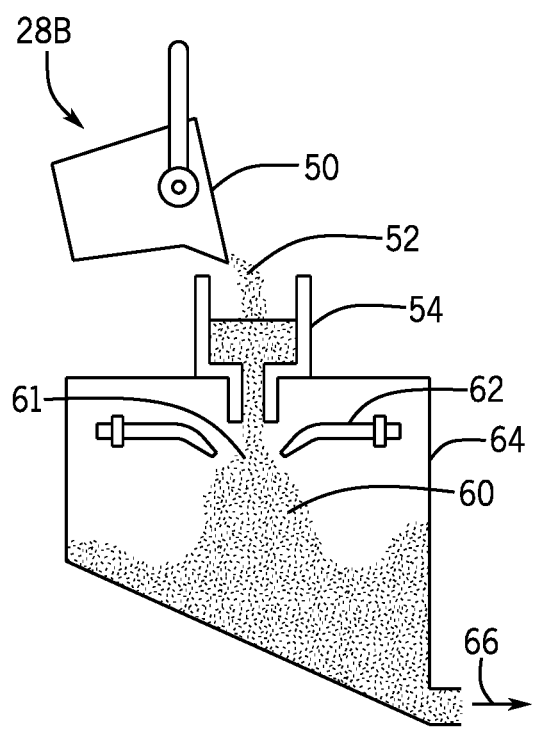
FIG. 3B illustrates a second embodiment of the metal powder production machine of the component production system of FIG. 2.

FIG. 3B illustrates an embodiment of a metal powder production machine 28B that uses a water atomization process to receive a molten metal and output a metal powder. The scrap metal is first melted into a molten metal 52 and contained within a ladle 50. The ladle 50 then pours the molten metal 52 into a tundish 54. Then the molten metal 52 flows through the hole in the bottom of the tundish 54 and comes into contact with an atomizing water spray 61 from a high-pressure water manifold 62, which separates the molten metal 52 into metal particles 60. The metal particles 60 then harden into a metal powder and combine with water from the atomizing water spray 61 in an atomizing tank 64. Then the mixture of the metal particles 60 and water flow along a path 66 to separate the metal particles 60 and the water.

Figure 3C:
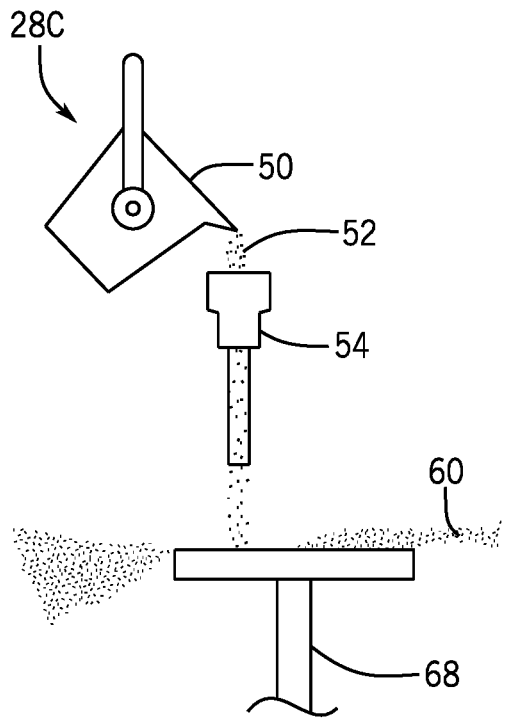
FIG. 3C illustrates a third embodiment of the metal powder production machine of the component production system of FIG. 2.

FIG. 3C illustrates an embodiment of a metal powder production machine 28C that uses a centrifugal atomization process to receive a molten metal and output a metal powder. The scrap metal is first melted into a molten metal 52 and contained within a ladle 50. The ladle 50 then pours the molten metal 52 into a tundish 54. Then the molten metal 52 flows through the hole in the bottom of the tundish 54 and comes into contact with a spinning disk 68, which separates the molten metal 52 into metal particles 60. The metal particles 60 then harden into a metal powder and are collected.

Figure 3D:
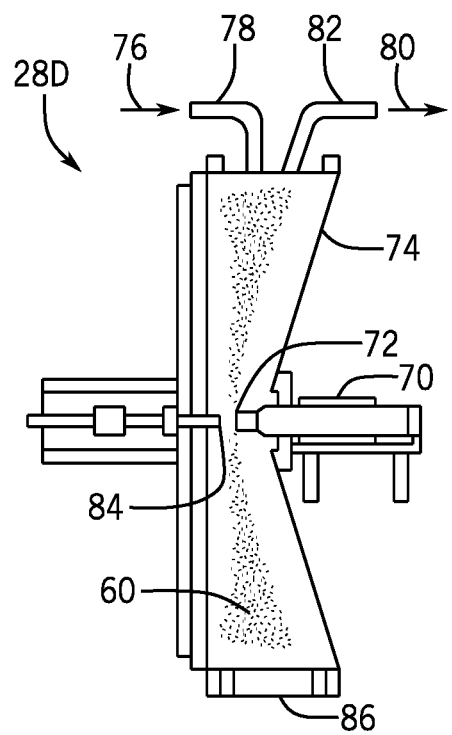
FIG. 3D illustrates a fourth embodiment of the metal powder production machine of the component production system of FIG. 2.

FIG. 3D illustrates an embodiment of a metal powder production machine 28D that uses a rotating consumable electrode atomization process to receive a conductive solid metal and output a metal powder. The scrap metal is fitted into a spindle 70 such that the scrap metal becomes a rotating consumable electrode 72. The spindle 70 and the rotating consumable electrode are placed in a chamber 74 that may be filled with an inert gas flow 76 through a first port 78 and/or the gas may be evacuated along a vacuum flow path 80 through a second port 82. A nonrotating electrode (e.g., a tungsten electrode) 84 may be inserted into the chamber 74, opposite of the rotating consumable electrode 72. Then, electricity is passed through the non-rotating electrode 84, which causes the rotating consumable electrode 72 to begin melting. While the rotating consumable electrode 72 is melting, the rotating consumable electrode 72 is spun such that as the rotating consumable electrode 72 melts, metal particles 60 separate from the rotating consumable electrode 72. Then, the metal particles 60 harden and fall into a collection port 86 at the bottom of the chamber 74.

FIGS. 4A through 4C illustrate embodiments of the additive manufacturing system 30. FIG. 4A illustrates an embodiment of an additive manufacturing system 30A that uses a powder bed fusion ("PBF") process to receive a metal powder and output a component. First, a controller 100 receives a computer model (e.g., a computer aided design drawing or computer aided manufacturing drawing) of a manufactured component 101 to be produced. For example, a user may interact with a display 105 to select a computer model. The display 105 may be physically coupled to the controller 100, or the display 105 may be remotely located. For example, the display 105 may be coupled to a different controller and remotely send (e.g., via Bluetooth, internet web link, etc.) the computer model to the controller 100.

After receiving the computer model, the controller 100 splits the model into a number of layers with each layer having a thickness. Further, the metal particles 60 collected from the metal powder production machine 28 are collected in a powder delivery system 100. To construct a layer of the component, a first piston 104 moves in a y-direction 108 to push the metal particles 60 upwards. Then, a roller 106 moves in an x-direction 110 to push the metal particles 60 toward a production area 112. The roller 106 deposits the metal particles 60 in the production area 112 such that the metal particles 60 have a thickness of one layer of the manufactured component 101. Then, the controller 100 sends a signal to a laser device 114 to produce a laser 116. The controller 100 also sends a signal to a scanning device 118 to control a position of the laser 116 by using a mirror 120. The mirror 120 directs the laser 116 to conform to the layer of the computer model of the manufactured component 101. The laser 116 causes the metal powder 60 to melt at the point of impact. After the layer of the manufactured component 101 is completed, a second piston 122 moves in the x-direction by a distance of the thickness of the layer, and the above process is repeated for each layer of the manufactured component 101 until all of the layers have been completed.

FIG. 4B illustrates an embodiment of an additive manufacturing system 30B that uses a direct energy deposition process to receive a metal powder and output a component. A focused thermal energy source 142 (e.g., a laser) is provided to melt the metal powder 60. The metal powder 60 is blown through one or more metal powder delivery nozzles 140 toward the focused thermal energy source 142. As the metal powder 60 passes through the focused thermal energy source 142, the metal powder 60 melts onto a deposition surface 144 of the manufactured component 101. The metal powder 60 is deposited onto the manufactured component 101 until the manufactured component 101 is complete.

FIG. 4C illustrates an embodiment of an additive manufacturing system 30C that uses a hot isostatic pressing process to receive a metal powder and output a component. The metal powder 60 is inserted into a chamber 150 filled with an inert gas 152 (e.g., argon). The metal powder 60 may be inserted into the chamber 150 in the desired shape of the manufactured component. Then the chamber 150 is heated, causing the pressure inside the chamber 150 to increase. In some embodiments, more inert gas 152 may be pumped into the chamber 150 to achieve the desired pressure. The heat and pressure inside of the chamber 150 causes the metal powder 60 to solidify into one piece. In addition, the pressure inside of the chamber 150 may be applied to components manufactured by either the additive manufacturing system 30A or the additive manufacturing system 30B to reduce the porosity and/or increase the density of the components.

Figure 5:
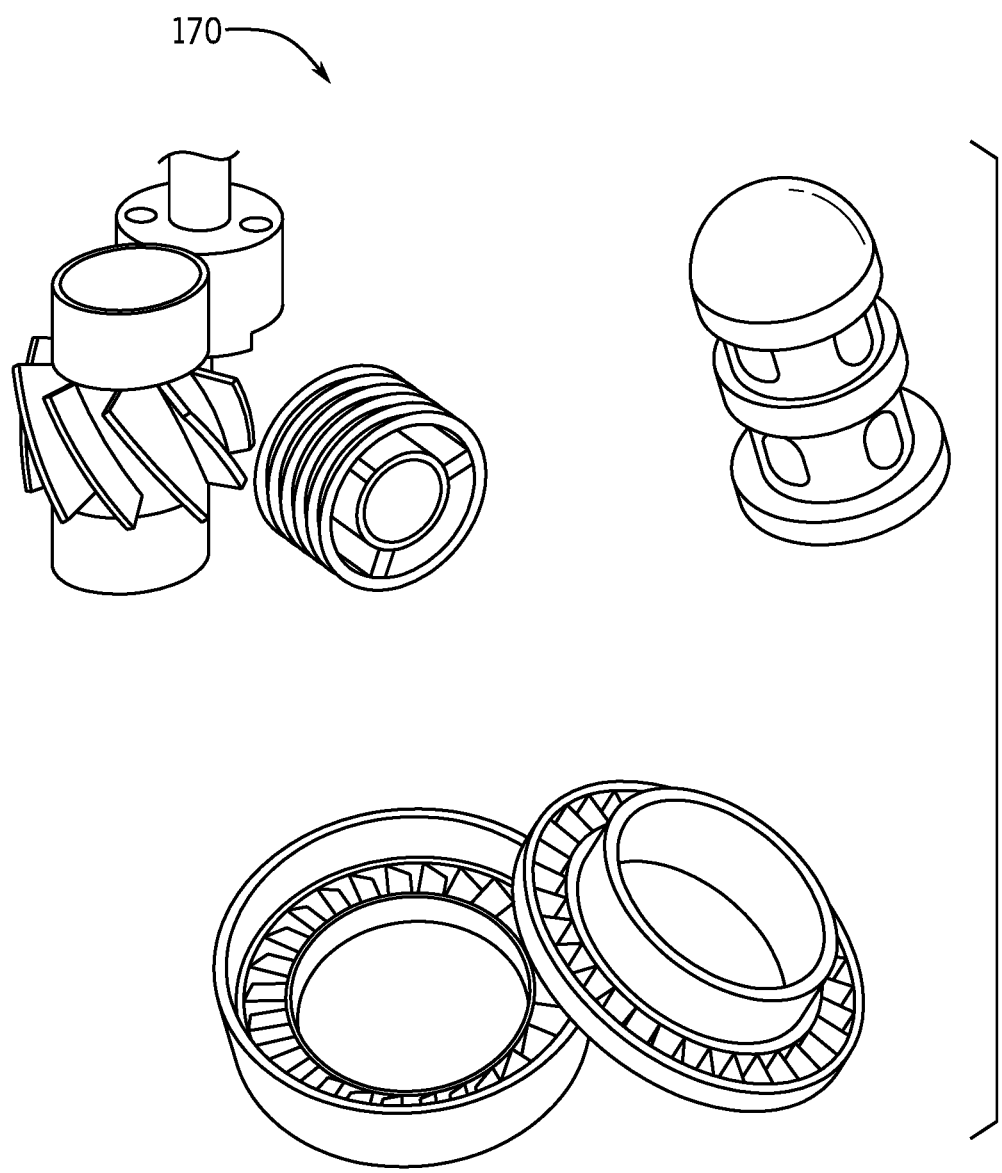
FIG. 5 illustrates possible components manufactured by the additive manufacturing system of the component production system of FIG. 2.

FIG. 5 illustrates possible components 170 manufactured by the additive manufacturing system 30. The possible components may include measurement while drilling alternators, rotary steerable pads wear band and stabilizer repair, port holes, flow diverters, drill bits, packer expansion elements, etc. As illustrated by the possible components 170, the additive manufacturing system 30 may manufacture a component having any shape or internal structure.

Figure 6:
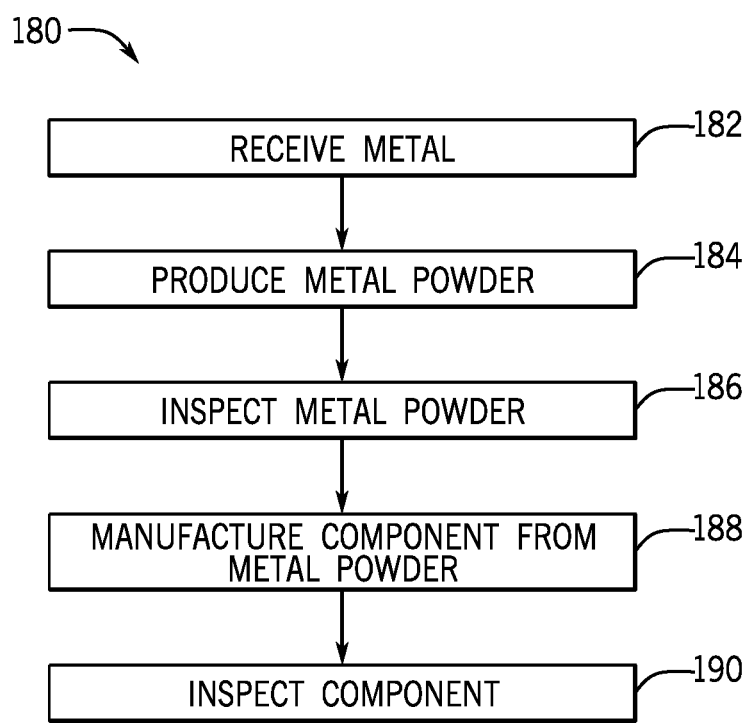
FIG. 6 is a flow chart depicting an embodiment of a method of producing a component at an industrial work site, such as the oil and gas work site of FIG. 1.

FIG. 6 is a flow chart depicting an embodiment of a method 180 of producing a component at an industrial work site. Although the following method 180 describes a number of operations that may be performed, it should be noted that the method 180 may be performed in a variety of suitable orders and all of the operations may not be performed. Further, some or all of the steps may be implemented by any combination of the control system 40, the metal powder production machine 28, the additive manufacturing system 30, or the process diagnosis machine 46.

The method 180 includes receiving (e.g., at the metal powder production machine) the metal (e.g., from the scrap metal area) (block 182). The metal may include any metal that is not being used in an operation at the industrial work site. For example, some components may degrade and/or break down such that they are no longer useful for their intended function. Rather than throwing the component away, the component may be stored so that the material of the component may be used for other purposes (e.g., metal powder production and/or additive manufacturing). The metal may also include excess metal from certain operations. For example, some components may be constructed or repaired at the industrial work site. After the construction or repair of components, there may be some metal left over. In addition, the metal may be brought and stored at the industrial work site for flexible usage.

After receiving the metal, the method 180 includes producing (e.g., via the metal powder production machine) metal powder from the received metal (block 184). The metal powder may be produced utilizing any suitable process to turn the metal into powder, including gas atomization, water atomization, atomization with a consumable electrode, centrifugal atomization, or any other process. The produced metal powder may include particles of any suitable size, including 0 to 120 micrometers, 0 to 25 micrometers, 15 to 45 micrometers, 30 to 65 micrometers, 45 to 100 micrometers, or 50 to 120 micrometers.

Next, the method 180 includes inspecting (e.g., via the process diagnosis machine) the produced metal powder (block 186). The metal powder may be inspected for chemical composition (e.g., determining which elements are present and in what concentration), particle size, particle uniformity, etc. In some embodiments, the inspection may include mixing the produced metal powder with other metal powders to alter a characteristic of the produced metal powder (e.g., chemical composition).

Then, the method 180 includes manufacturing (e.g., via the additive manufacturing system) a component from the metal powder (block 188). The component may be manufactured utilizing a hot isostatic pressing ("HIP") process, a powder bed fusion ("PBF") process, a direct energy deposition process, or any other process to turn metal powder into useable components. The manufactured components may include measurement while drilling alternators, rotary steerable pads wear band and stabilizer repair, port holes, flow diverters, drill bits, packer expansion elements, etc.

Next, the method 180 includes inspecting (e.g., via the process diagnosis machine or by on-site or remote operators) the manufactured component (block 190). Inspecting the manufactured component may use non-destructive testing (e.g., x-ray imaging, computerized axial tomography scans, etc.) to determine if the manufactured component complies with certain standards applicable to the component produced (e.g., chemical composition, density, porosity, homogeneity, etc.).

With the foregoing in mind, embodiments presented herein provide systems and methods that enable production of components at remote work sites. The systems and methods include a metal powder production machine and/or an additive manufacturing system on a mobile platform that enables component production at any location. Providing a metal powder production machine and/or an additive manufacturing system on a mobile platform also reduces the time to receive replacement parts at a work site.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:
1. A system comprising:
   a mobile platform configured to be dispatched to an oil and gas work site, wherein the mobile platform is separate from and configured to couple to a plurality of vehicles, the mobile platform comprising:
   a metal powder production machine having inputs of scrap metal or spare parts from the oil and gas work site and an additional metal powder and an output of a scrap metal powder, wherein the metal powder production machine is configured to atomize the scrap metal or the spare parts via at least one of a gas atomization process, a water atomization process, a centrifugal atomization process, or a consumable electrode atomization process;
   a process diagnosis machine configured to determine a chemical composition of the scrap metal powder produced by the metal powder production machine, wherein the process diagnosis machine comprises a camera, a dye pen, an x-ray imaging device, a computerized axial tomography scan device, or a powder blender, and wherein determining the chemical composition of the scrap metal powder comprises determining one or more elements that comprise the scrap metal powder and determining concentrations of the one or more elements in the scrap metal powder;
   an additive manufacturing system configured to receive the scrap metal powder and output a downhole exploration and production tool configured to be used during formation of a wellbore from the oil and gas work site; and
   a control system communicatively connected to the metal powder production machine and the additive manufacturing system, wherein the control system comprises a computer application executable by a computing device, and wherein the computer application, when executed by the computing device in response to receiving the chemical composition of the scrap metal powder that is determined by the process diagnosis machine, causes the computer application to:
     transmit a first control signal to cause the metal powder production machine to output the scrap metal powder based at least in part on the chemical composition of the scrap metal powder that is determined by the process diagnosis machine;
     transmit a second control signal to cause the additive manufacturing system to output the downhole exploration and production tool using the scrap metal powder based at least in part on the chemical composition of the scrap metal powder that is determined by the process diagnosis machine; and
     transmit a third control signal to cause the process diagnosis machine to alter the chemical composition of the scrap metal powder based at least in part on the chemical composition of the scrap metal powder that is determined by the process diagnosis machine by removing at least a portion of the additional metal powder from the scrap metal powder produced by the metal powder production machine;
   wherein the process diagnosis machine is further configured to perform non-destructive testing on the downhole exploration and production tool to determine whether the downhole exploration and production tool complies with one or more standards for the downhole exploration and production tool relative to downhole conditions to be experienced by the downhole exploration and production tool during formation of the wellbore, wherein compliance with the one or more standards is determined based on chemical composition of the downhole exploration and production tool, density of the downhole exploration and production tool, porosity of the downhole exploration and production tool, or homogeneity of the downhole exploration and production tool as determined by the non-destructive testing.

2. The system of claim 1, wherein the mobile platform comprises a storage container configured to couple to a vehicle.

3. The system of claim 1, wherein the additive manufacturing system is configured to receive computer models remotely, and wherein the computer models comprise computer aided drawings of a plurality of manufactured tools.

4. The system of claim 1, wherein the additive manufacturing system is configured to be controlled by a remote device, and wherein the remote device comprises a smartphone or a tablet.

5. The system of claim 1, wherein the downhole exploration and production tool comprises a measurement while drilling alternator, a rotary steerable pad, a wear band, a port hole, a flow diverter, a drill bit, or a packer expansion element, or any combination thereof.

6. The system of claim 1, wherein the additive manufacturing system is configured to output the downhole exploration and production tool via at least one of a hot isostatic pressing process, a powder bed fusion process, or a direct energy deposition process.

7. The system of claim 1, wherein the process diagnosis machine is configured to determine an amount of the scrap metal powder produced by the metal powder production machine, wherein the computer application, when executed by the computing device in response to receiving the chemical composition of the scrap metal powder that is determined by the process diagnosis machine, causes the computer application to:
transmit the first control signal to cause the metal powder production machine to adjust an operating parameter of the metal powder production machine based at least in part on the amount and the chemical composition of the scrap metal powder that is determined by the process diagnosis machine;
transmit the second control signal to cause the additive manufacturing system to output the downhole exploration and production tool using the scrap metal powder based at least in part on the amount and the chemical composition of the scrap metal powder that is determined by the process diagnosis machine; and
transmit a fourth control signal to cause the additive manufacturing system to adjust an operating parameter of the additive manufacturing system based at least in part on the determination of whether the downhole exploration and production tool complies with the one or more standards for the downhole exploration and production tool.

8. The system of claim 1, wherein the process diagnosis machine comprises the camera.

9. The system of claim 1, wherein the process diagnosis machine comprises the dye pen.

10. The system of claim 1, wherein the process diagnosis machine comprises the x-ray imaging device.

11. The system of claim 1, wherein the process diagnosis machine comprises the computerized axial tomography scan device.

12. The system of claim 1, wherein the process diagnosis machine comprises the powder blender.

13. The system of claim 1, wherein the metal powder production machine comprises the gas atomization process that melts the scrap metal or spare parts into molten metal contained within a ladle of the metal powder production machine, which pours the molten metal into a tundish of the metal powder production machine, wherein the tundish comprises a hole in a bottom of the tundish through which the molten metal flows and comes into contact with an atomizing gas spray, wherein the atomizing gas spray separates the molten metal into metal particles that harden into the scrap metal powder in an atomizing chamber of the metal powder production machine.

14. The system of claim 1, wherein the metal powder production machine comprises the water atomization process that melts the scrap metal or spare parts into molten metal contained within a ladle of the metal powder production machine, which pours the molten metal into a tundish of the metal powder production machine, wherein the tundish comprises a hole in a bottom of the tundish through which the molten metal flows and comes into contact with an atomizing water spray from a high-pressure water manifold of the metal powder production machine, wherein the atomizing water spray separates the molten metal into metal particles that harden into the scrap metal powder and combine with water from the atomizing water spray in an atomizing tank of the metal powder production machine, and wherein the metal powder production machine further includes a separation flow path within which the scrap metal powder and the water separate.

15. The system of claim 1, wherein the metal powder production machine comprises the centrifugal atomization process that melts the scrap metal or spare parts into molten metal contained within a ladle of the metal powder production machine, which pours the molten metal into a tundish of the metal powder production machine, wherein the tundish comprises a hole in a bottom of the tundish through which the molten metal flows and comes into contact with a spinning disk of the metal powder production machine, wherein the spinning disk separates the molten metal into metal particles that harden into the scrap metal powder.

16. The system of claim 1, wherein the metal powder production machine comprises the consumable electrode atomization process wherein the scrap metal or spare parts are fitted into a spindle of the metal powder production machine such that the metal powder production machine becomes a rotating consumable electrode, wherein the spindle and rotating consumable electrode are placed in a chamber of the metal powder production machine that is filled with an inert gas flow, wherein the chamber comprises a nonrotating electrode opposite the rotating consumable electrode through which electricity passes to melt the rotating consumable electrode while the rotating consumable electrode spins such that metal particles separate from the rotating consumable electrode, and wherein the metal particles harden into the scrap metal powder and fall into a collection port of at a bottom of the chamber.

* * * * *